: US010940716B2

(12) United States Patent
Li

(10) Patent No.: US 10,940,716 B2
(45) Date of Patent: Mar. 9, 2021

(54) ESCAPE DEVICE FOR SELF-RESCUE IN CASE OF AUTO TYRE BEING TRAPPED IN PIT

(71) Applicant: SUZHOU JILIXING AUTOMOTIVE SUPPLIES TECHNOLOGY CO., LTD., Suzhou (CN)

(72) Inventor: Xingyan Li, Suzhou (CN)

(73) Assignee: SUZHOU JILIXING AUTOMOTIVE SUPPLIES TECHNOLOGY CO., LTD., Jiangsu (CN)

( * ) Notice: Subject to any disclaimer, the term of this patent is extended or adjusted under 35 U.S.C. 154(b) by 316 days.

(21) Appl. No.: 15/760,202

(22) PCT Filed: Feb. 2, 2016

(86) PCT No.: PCT/CN2016/073191
§ 371 (c)(1),
(2) Date: Mar. 14, 2018

(87) PCT Pub. No.: WO2017/128451
PCT Pub. Date: Aug. 3, 2017

(65) Prior Publication Data
US 2018/0257426 A1    Sep. 13, 2018

(30) Foreign Application Priority Data

Jan. 27, 2016 (CN) .......................... 201610052498.5

(51) Int. Cl.
*B60B 15/18* (2006.01)
*B60C 27/20* (2006.01)
(Continued)

(52) U.S. Cl.
CPC ............ *B60B 15/18* (2013.01); *B60B 15/266* (2013.01); *B60C 27/0269* (2013.01);
(Continued)

(58) Field of Classification Search
CPC ....... B60B 15/00; B60B 15/18; B60C 27/023; B60C 27/0261; B60C 27/0269; B60C 27/04; B60C 27/20
See application file for complete search history.

(56) References Cited

U.S. PATENT DOCUMENTS 2,598,851 A * 6/1952 Spevak ................... B60C 27/04
                                                     301/43
2,777,527 A * 1/1957 Kleem .................... B66F 3/005
                                                     180/7.1
(Continued)

FOREIGN PATENT DOCUMENTS

| CN | 204605392 U | * | 9/2015 | ............. B60C 27/00 |
| CN | 204674557 U | * | 9/2015 | ............. B60C 27/00 |
| RU | 2107633 C1 | * | 3/1998 | ............. B60C 27/04 |

*Primary Examiner* — Jason R Bellinger
(74) *Attorney, Agent, or Firm* — Proi Intellectual Property US; Klaus Michael Schmid

(57) ABSTRACT

An escape device for self-rescue in the case of an auto tyre being trapped in a pit includes a central positioning device, at least one tyre claw and a jacking device. The central positioning device is positioned and mounted at a central position of a wheel. The tyre claw and the central positioning device are fitted to each other and are clamped onto the tyre. The jacking device and the tyre claw are fitted to each other. The jacking device is further provided with a jacking head in contact with the pit ground. The jacking head protrudes out of an external rim of the tyre. The escape device for self-rescue can carry out effective rescue for trapped tyres, is convenient and fast to assemble and disassemble, saves time and energy, improves driving safety, and reduces the occurrence of accidents.

18 Claims, 16 Drawing Sheets

(51) Int. Cl.
    *B60C 27/02*    (2006.01)
    *B60B 15/26*    (2006.01)
(52) U.S. Cl.
    CPC ........ *B60C 27/20* (2013.01); *B60B 2900/721* (2013.01); *B60B 2900/731* (2013.01)

(56) References Cited

U.S. PATENT DOCUMENTS

| | | | | |
|---|---|---|---|---|
| 3,117,612 | A * | 1/1964 | Minutilla | B60C 27/04 152/216 |
| 4,287,926 | A * | 9/1981 | Wong | B60C 27/04 152/225 C |
| 4,306,604 | A * | 12/1981 | Snider | B60C 27/02 152/225 R |
| 5,076,335 | A * | 12/1991 | Koshi | B60C 27/12 152/219 |
| 5,156,695 | A * | 10/1992 | Martin | B60C 27/04 152/216 |
| 6,450,224 | B1 * | 9/2002 | Ward | B60B 15/266 152/218 |
| 6,983,778 | B1 * | 1/2006 | Pitts | B60B 15/22 152/216 |
| 7,426,949 | B2 * | 9/2008 | Chaisson, Jr. | B60C 27/04 152/218 |
| 8,708,012 | B2 * | 4/2014 | Jourdan | B60C 27/12 152/216 |
| 2005/0146205 | A1 * | 7/2005 | Sakakibara | B60C 27/04 301/41.1 |

* cited by examiner

ESCAPE DEVICE FOR SELF-RESCUE IN CASE OF AUTO TYRE BEING TRAPPED IN PIT

CROSS REFERENCE TO RELATED APPLICATIONS

The present application is the US national stage of International Patent Application PCT/CN2016/073191 filed on Feb. 2, 2016, which, in turn, claims priority to Chinese Patent Application CN 201610052498.5 filed on Jan. 27, 2016.

TECHNICAL FIELD

The present invention relates to the field of technical equipment for the self-rescue of automobiles trapped in pits, and in particular to an escape device for self-rescue in the case of an auto tyre being trapped in a pit.

BACKGROUND ART

The invention of the automobile has brought great convenience to people's travel. As the automobile industry is constantly developing, people not only require the safety and comfort of driving automobiles, and also require the multifunctionality of automobiles. However, when an automobile is running in the desert or on a muddy unpaved road, due to the influence of factors such as a weather condition or a geographic environment, the tyres of the automobile will often be trapped in sand pits or earth pits, and at this moment, the automobile cannot run away and is trapped. In winter, especially the snowy climate of the north, snow is accumulated on roads, the ground is wet and slippery, many automobiles will encounter the wet and slippery problems of the roads, and accidents will take place frequently.

In the long-term running process of automobiles, phenomena, such as tyre skidding, trapping in pits and sinking, may often occur, and even cause accidents in severe cases, and it is even more so in the cases of rainy days in summer, ice and snow in winter and harsh road surface conditions. Therefore, auto tyre skidding prevention, sinking prevention, trapping prevention and sinking self-rescue escape measures are of great significance in ensuring the normal and safe running of vehicles.

At present, there have been a variety of tyre skidding prevention devices in the market, and anti-skid chains which are made of iron chains, gum chains or rubber chains are most common. Anti-skid chains mounted on tyres can generate great pressure on the ground and increase frictional force with the road surface, playing an anti-skid role, and thereby the running safety performance of vehicles is improved. The existing defects are difficulty in dismounting and mounting, heavy weight, tyre wear and severe pavement destruction, and the running safety of automobiles will be affected to a certain degree. Especially in the northern and northwestern regions of China, as the ice and snow period in winter is long, tens of thousands of various traffic accidents of vehicles caused by wet and slippery road surfaces, trapping in pits and sinking have occurred every year. However, the anti-skid effect of anti-skid chains in the prior art is not ideal in practical application; and sinking or trapping self-rescue measures are imperfect. Moreover, anti-skid chains and self-rescue equipment are complex to mount and dismount, and a great deal of time and labor are consumed.

SUMMARY OF THE INVENTION

In order to solve the foregoing technical problems, the present invention provides an escape device for self-rescue in the case of an auto tyre being trapped in a pit, which can effectively rescue a skidding, sinking or trapped automobile, is convenient and quick to assemble and disassemble, and can save time and labor, increase driving safety and reduce the occurrence of accidents.

In order to achieve the foregoing objective, the main technical solution provided by the present invention is as follows: disclosed is an escape device for self-rescue in the case of an auto tyre being trapped in a pit, which is characterized by comprising a central positioning device, at least one tyre claw and a jacking device. When an auto tyre needs to escape, the central positioning device is positioned at a central position of the wheel, the tyre claw and the central positioning device are fitted to each other and clamp the tyre, the jacking device and the tyre claw are fitted to each other and clamp the tyre, the jacking device is further provided with a jacking head in contact with the pit ground, and the jacking head protrudes out of the outer surface of the tyre. Preferably, the central positioning device comprises a central positioning disk, which is fixedly mounted at the central position of the spokes.

Preferably, the central positioning disk is provided with a central screw hole and screw holes evenly distributed around the central screw hole, and the central threaded hole is aimed at an axle hole of the central position of the spokes, while the screw holes are aimed at small holes of the central position of the wheel and the screw holes and the small holes are fixed together by bolts.

Preferably, the central positioning device further comprises a suction cup and a screw inserted in the central screw hole, the suction cup sucks the central position of the spokes, and one end of the screw is connected to the suction cup, while the other end is provided with a handle.

Preferably, the central positioning device further comprises at least one set of parallel rings, and the parallel rings are arranged on the outer edge of the central positioning disk and consists of a plurality of rings.

Preferably, the tyre claw is provided with an external claw portion, an internal claw portion and an upper claw portion connected between the external claw portion and the internal claw portion, and both the length and width of the external claw portion, the internal claw portion or the upper claw portion can be adjusted.

Preferably, the external claw portion comprises a connecting plate, the lower end of the connecting plate is provided with threaded hooks, the central positioning device comprises at least one set of parallel rings, and the threaded hooks are fastened with the parallel rings.

Preferably, the jacking device comprises a jacking holder, the jacking holder comprises a tubular body and fixing claws arranged on both sides of the tubular body, the tyre claw is provided with fastening slots, and the fixing claws are fitted in the fastening slots.

Preferably, one end of the tubular body is provided with the jacking head, and the other end is provided with a rubber pad.

Preferably, a spring and a locking pin are arranged in the tubular body.

Preferably, the jacking holder is provided with an upper jaw and an inner jaw which are mounted on the auto tyre, and the upper jaw extends outward from the tubular body.

Preferably, the escape device for self-rescue in the case of an auto tyre being trapped in a pit further comprises a driving disk, and the driving disk is mounted on the central positioning device and fitted to an external device.

Preferably, the escape device for self-rescue in the case of an auto tyre being trapped in a pit further comprises anti-skid chain plates.

In addition, the present invention further discloses a method for mounting and using the escape device for self-rescue in the case of an auto tyre being trapped in a pit, which comprises the following steps:

(1) the tyre claws are assembled, more specifically, at least one group of tyre claws are chosen, and after being adjusted to corresponding heights according to the size of an actual auto tyre, the tyre claws are assembled evenly onto a wheel along the radial direction of the wheel in a fastening manner;

(2) the central positioning device is assembled, more specifically, the central positioning device is mounted at the central position of the spokes of the auto tyre trapped in a pit, and is fastened fixedly with the tyre claws;

(3) the jacking device is mounted on the auto tyre, and is fitted fixedly to the tyre claw; and (4) an automobile is started, the jacking device rotates along with the trapped tyre, so that the jacking head thereon is supported on the snow or pit ground to jack the auto tyre, and thereby the automobile gets out of the pit.

The method for mounting and using the escape device for self-rescue in the case of an auto tyre being trapped in a pit can further comprise providing an anti-skid chain plate device, the anti-skid chain plate device comprises anti-skid chain plates and a tying device, and the tying device is fastened fixedly with the central positioning disk and fixedly mounts the anti-skid chain plates on the tread of the auto tyre.

The method for mounting and using the escape device for self-rescue in the case of an auto tyre being trapped in a pit can further comprise providing a driving disk, and the driving disk is mounted on the central positioning device and fitted to an external device.

Thus it can be seen that compared with the prior art, the present invention has the following advantages: when an auto tyre encounters a pit and skids to idle, the escape device can be used for effectively, conveniently, quickly and safely getting the auto tyre out of the pit in a "jacking" manner, and the escape device can be dismounted and restored quickly; and the escape device is convenient to use and easy and quick to assemble and disassemble. The present invention can also be applied in the process of natural disaster rescue. As the escape device is equipped with the anti-skid chain plates and the driving disk, the escape device can rescue other trapped and sinking automobiles; the anti-skid chain plates can be quickly and conveniently assembled for use, and are very suitable for wet and slippery road surfaces; and by arranging the driving disk, the escape device can be connected to other tools and equipment, so that the application range of the present invention can be further broadened.

BRIEF DESCRIPTION OF THE DRAWINGS

FIG. 3 is a structural schematic diagram of a central positioning device in the escape device for self-rescue in the case of an auto tyre being trapped in a pit in FIG. 1, wherein

FIG. 4 is a structural schematic diagram of a tyre claw in the escape device for self-rescue in the case of an auto tyre being trapped in a pit in FIG. 1, wherein

FIGS. 8a-8c are schematic diagrams of a driving disk of the escape device for self-rescue in the case of an auto tyre being trapped in a pit corresponding to preferred embodiments of the present invention, wherein FIG. 8a is a four-hole driving disk, FIG. 8b is a five-hole driving disk, and FIG. 8c is a six-hole driving disk.

FIGS. 9a-9e are schematic diagrams of an anti-skid chain plate of the escape device of the present invention, wherein FIG. 9a is a front view of a chain link; FIG. 9b is a top view of the chain link; FIG. 9c is a side view of the chain link; FIG. 9d is a three-dimensional diagram of the chain link; and FIG. 9e is a plane view of the chain link.

FIGS. 10a-10c are schematic diagrams of a positioning plate of an anti-skid chain plate device, wherein FIG. 10a is a three-dimensional schematic diagram of the positioning plate; FIG. 10b is a top view of the positioning plate; and FIG. 10c is a side view of the positioning plate.

FIGS. 11a-11d are schematic diagrams of the installation of the anti-skid chain plate device of the escape device of the present invention and the tyre, wherein FIG. 11a is a three-dimensional diagram, FIG. 11b is a top view, FIG. 11c is another three-dimensional diagram, and FIG. 11d is a front view.

Figure 1:
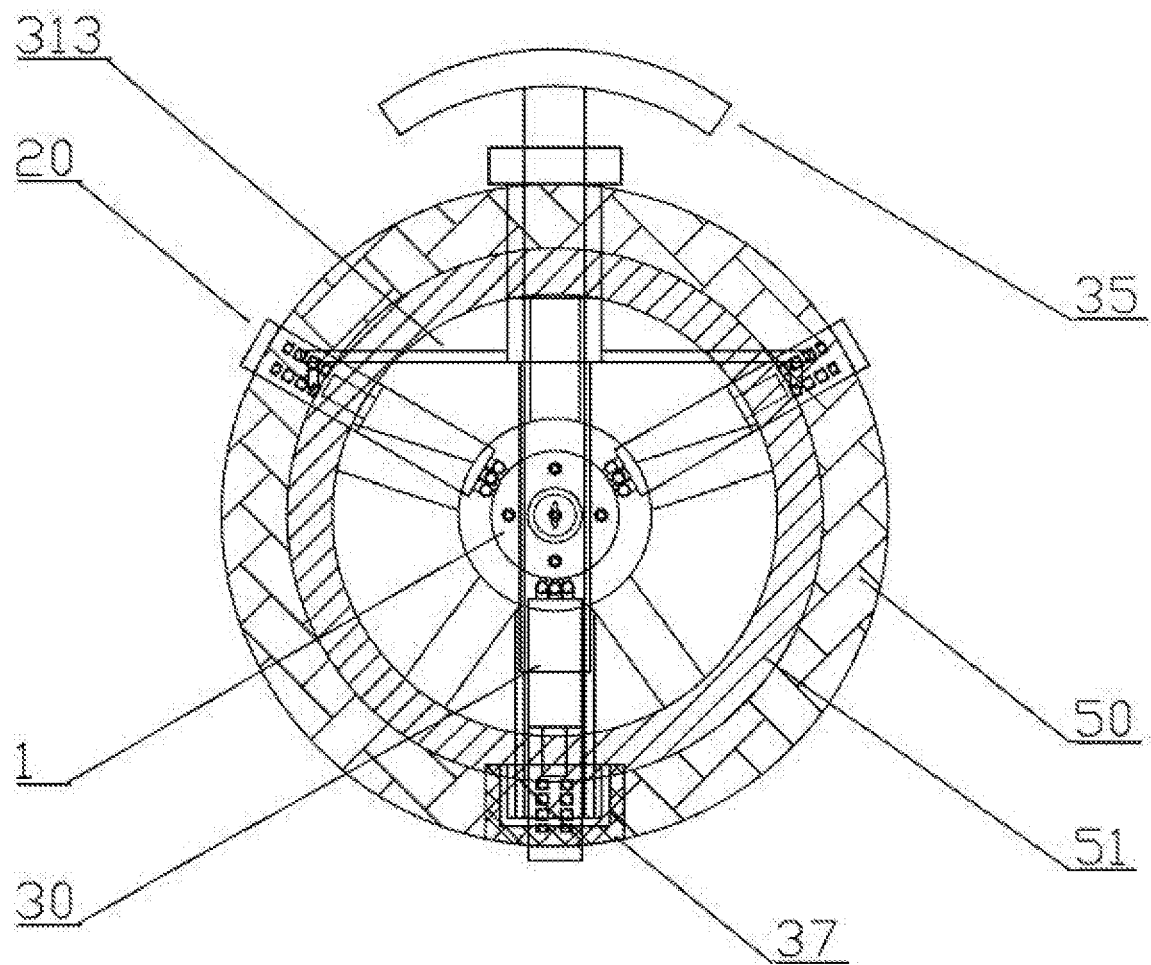
FIG. 1 is a schematic diagram of the assembly of an escape device for self-rescue in the case of an auto tyre being trapped in a pit corresponding to preferred embodiments of the present invention and an auto tyre.

Names of the corresponding parts represented by the numbers in the drawings:
10. Central positioning disk
11. Suction cup
12. Screw
13. Handle
14. Screw hole
15. Parallel ring
20. Tyre claw
21. Internal claw portion
22. Upper claw portion
23. External claw portion
24. Fastening slot
25. Connecting plate
26. Threaded hook
30. Jacking device
31. Jacking holder
310. Tubular body
311. Inner jaw
312. Upper jaw
313. Fixing claw
314. Sleeve
32. Section tube
33. External tube
34. Internal tube
35. Jacking head
36. Supporting tube
315. Fastening head
41. Slide way
42. Guide plate
43. Bolt hole
44. Central screw hole
45. Surrounding screw hole 50. Tyre
51. Wheel
52. Spoke
54. Central position
55. Tread
56. Small hole
60. Chain plate device
61. Lug
62. Chain link
63. Slot
64. Anti-skid surface
65. Fastening hole
66. Resistance-increasing surface
68. First connector
69. Second connector
70. Positioning plate
71. Fastening hook
72. Tying strap
73. Positioning pin
74. Connecting ring
75. Tying device
76. Connecting hook

DETAILED DESCRIPTION OF THE
PREFERRED EMBODIMENTS

Figure 2:
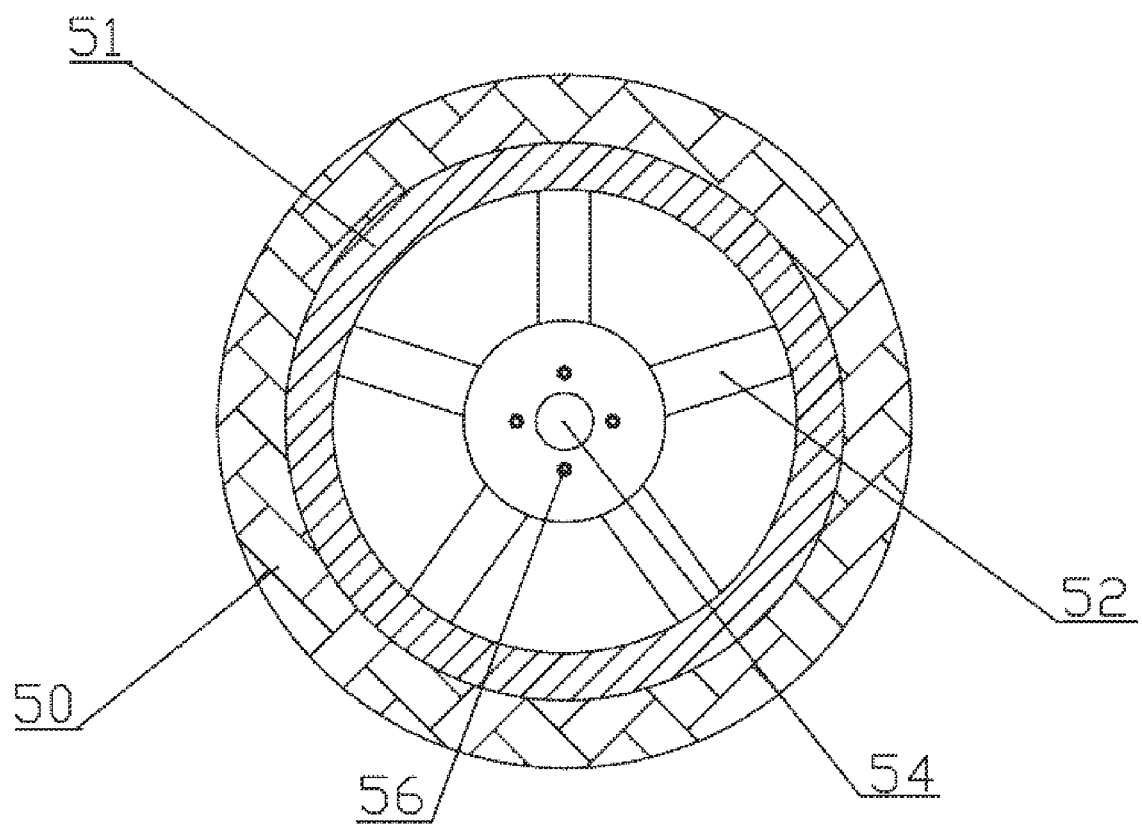
FIG. 2 is a schematic diagram of the auto tyre in FIG. 1.

The technical solution of the present invention will be further non-restrictively elaborated below in reference to preferred embodiments and drawings thereof. Referring to FIG. 1 and FIG. 2, an escape device for self-rescue in the case of an auto tyre being trapped in a pit corresponding to preferred embodiments of the present invention mainly comprises a central positioning device 1, at least one tyre claw 20 and a jacking device 30, wherein the central positioning device 1 is positioned at a central position 54 of wheel 51, the tyre claw 20 and the central positioning device 1 are fitted to each other and clamp the tyre 50, and the jacking device 30 and the tyre claw 20 are fitted to each other and are clamped onto the tyre 50.

Figure 3A:
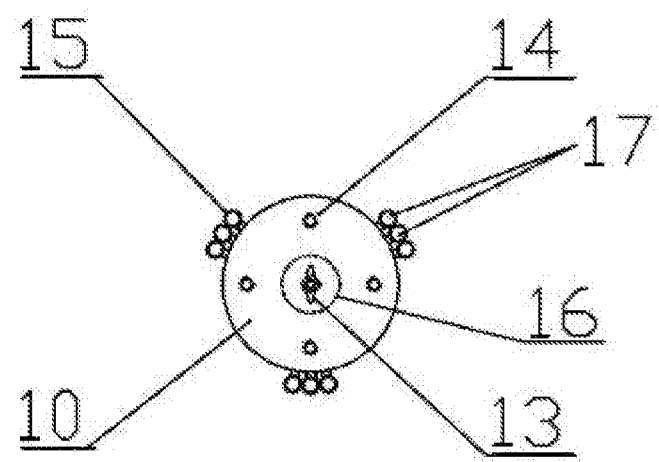
FIG. 3a is a main view.
Figure 3B:
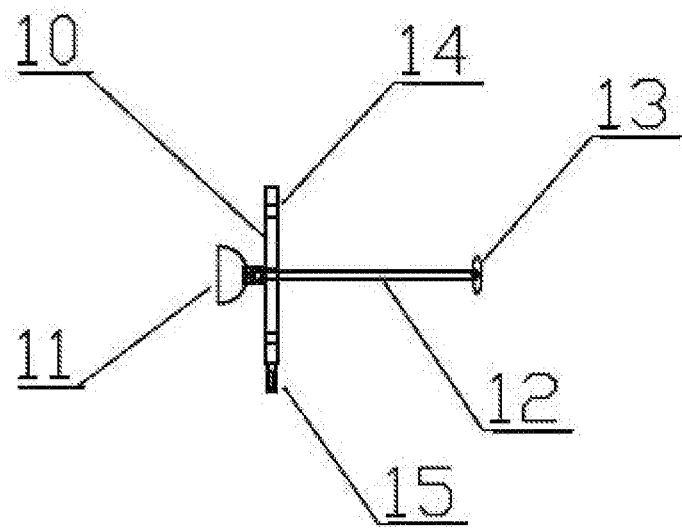
FIG. 3b is a side view.
Figure 4A:
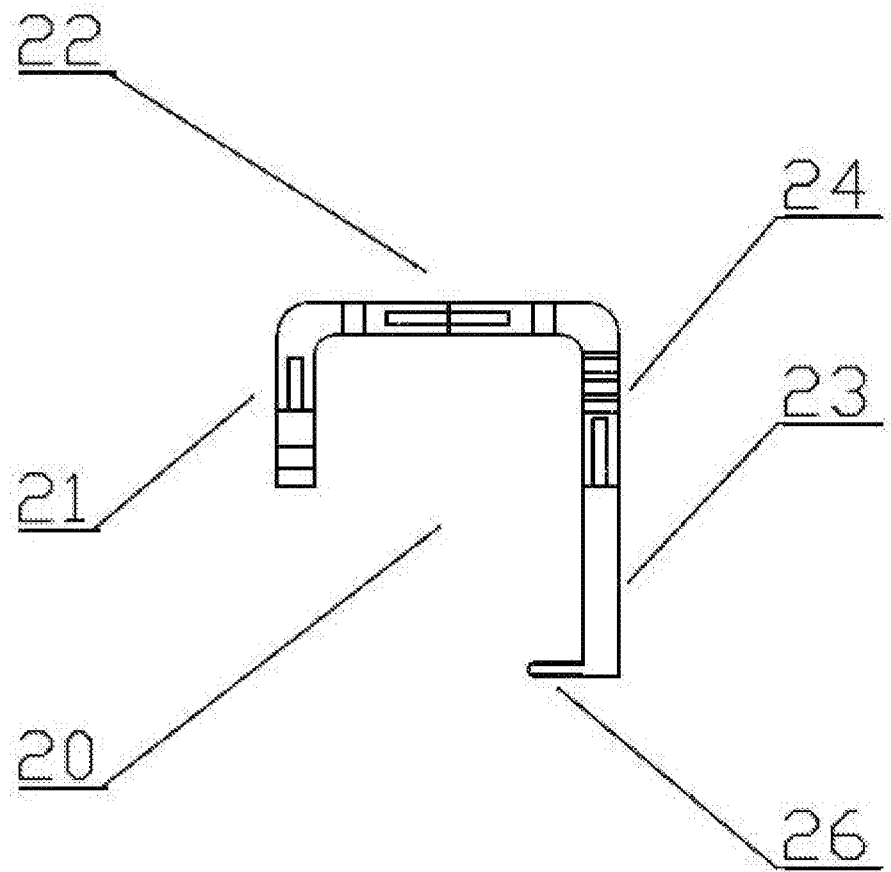
FIG. 4a is a main view.
Figure 4B:
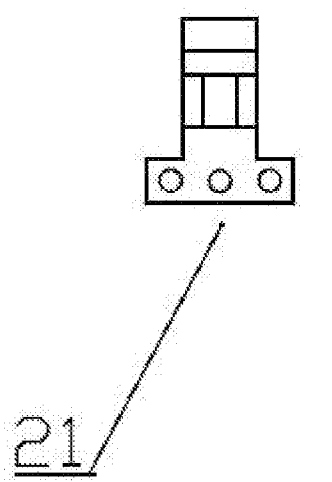
FIG. 4b is a left view.
Figure 4C:
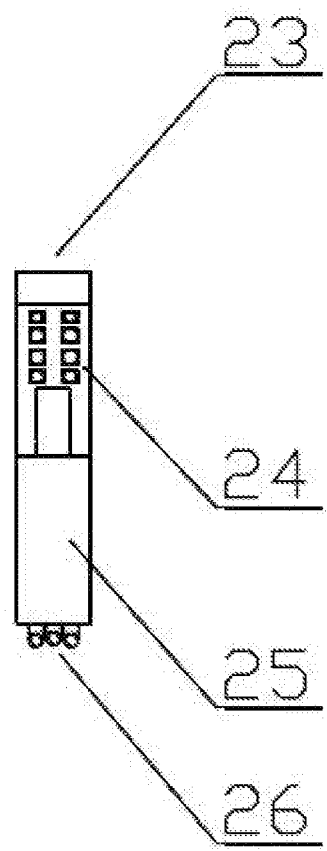
FIG. 4c is a right view.
Figure 4D:
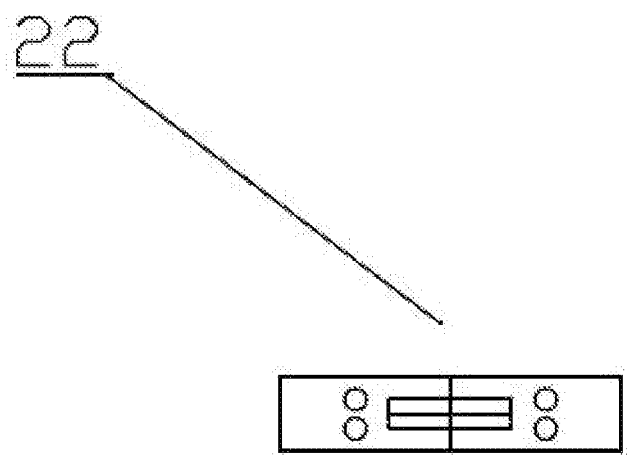
FIG. 4d is a top view.

Further referring to FIG. 3, the forgoing central positioning device 1 comprises a central positioning disk 10, a screw 12 inserted in the central positioning disk 10, a suction cup 11 arranged at one end of the screw 12 and a handle 13 arranged at the other end of the screw 12. Specifically, the central positioning disk 10 is shaped like a disk, and is provided with a central screw hole 16 and screw holes 14 evenly distributed around the central screw hole 16. The size of the central screw hole 16 matches the size of the central position 54 of the wheel 51; and screw holes 14 correspond to small holes 56 in the wheel 51, while the central screw hole 16 corresponds to the central position 54 of the wheel 51.

In addition, at least one set of parallel rings 15 is arranged on the outer edge of the central positioning disk 10, and each set of parallel rings 15 consists of a plurality of rings 17. Corresponding to the preferred embodiments of the present invention, there are three sets of parallel rings 15, which are distributed evenly on the outer edge of the central positioning disk 10, and each set of parallel rings 15 consists of a plurality of rings 17. The screw 12 is inserted in the central screw hole 16. The suction cup 11 is shaped like part of a ball, and is fixedly mounted at one end of the screw 12, while the handle 13 is mounted fixedly at the other end of the screw 12.

Figure 5:
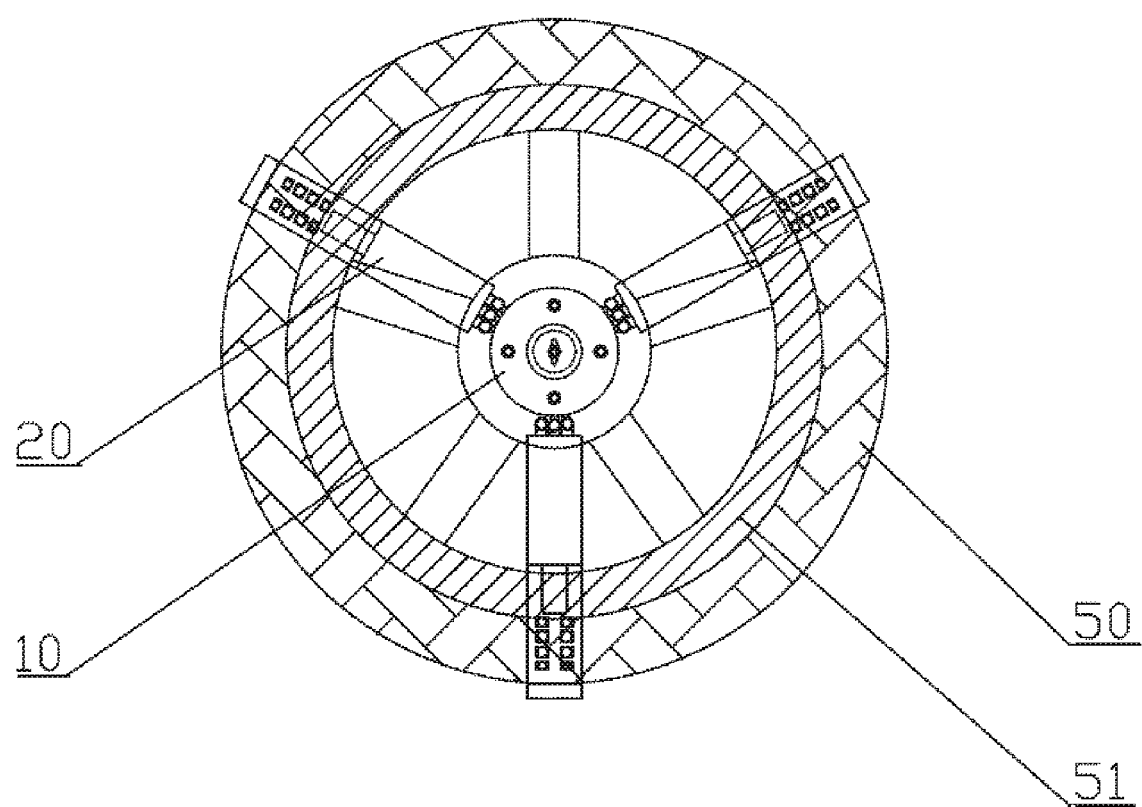
FIG. 5 is a schematic diagram of the assembly of the central positioning device and the tyre claw.

Referring to FIG. 4 and FIG. 5, the foregoing tyre claw 20 is almost shaped like a hook, and is provided with an external claw portion 23, an internal claw portion 21 and an upper claw portion 22 connected between the external claw portion 23 and the internal claw portion 21, and both the length and width of the external claw portion 23, the internal claw portion 21 or the upper claw portion 22 can be adjusted. Both ends of the upper claw portion 22 are respectively produced along with the internal claw portion 21 of the same side and the external claw portion 23 of the same side at right angles as a whole, and the joint angles between the internal claw portion 21, the external claw portion 23 and the upper claw portion 22 are all arranged as arcs in order to enlarge the area of contact with the tyre 50. The internal claw portion 21 is fastened with the inner side of the tyre 50, the upper claw portion 22 is fastened with the top of the tyre 50, and the external claw portion 23 is fastened with the outer side of the tyre 50.

The external claw portion 23 is provided with a connecting plate 25, the lower end of the connecting plate 25 is provided with three threaded hooks 26, and the threaded hooks 26 are used for being fastened with the corresponding rings 17 of the parallel rings 15 on the central positioning disk 10. The internal claw portion 21, the upper claw portion 22 and the external claw portion 23 are respectively provided with a plurality of fastening slots 24 in two rows, which are used for being connected fixedly to one another through anti-skid chain plates (not shown in the drawings) or connecting cables (not shown in the drawings) or being connected fixedly to the jacking device 30.

Figure 6:
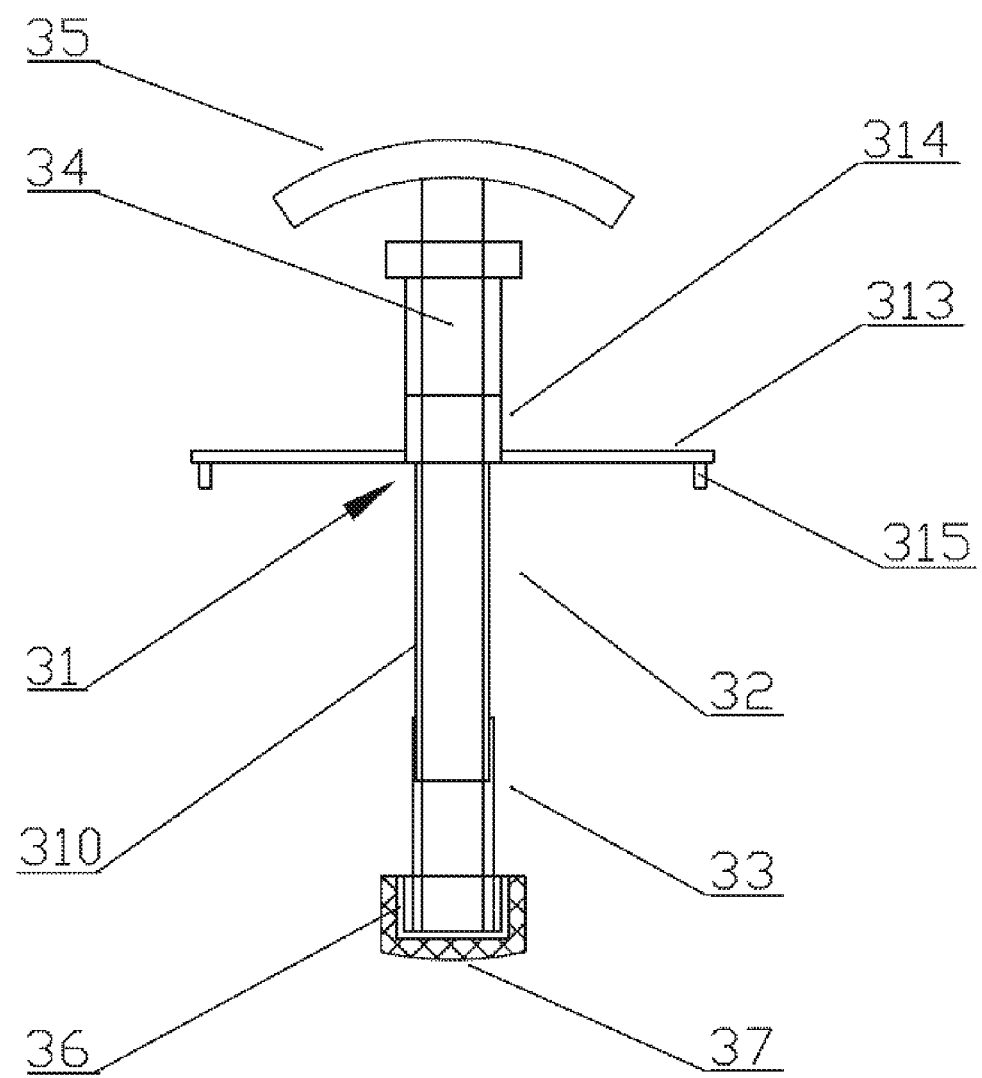
FIG. 6 is a main view of a jacking device of the escape device for self-rescue in the case of an auto tyre being trapped in a pit in FIG. 1.
Figure 7:
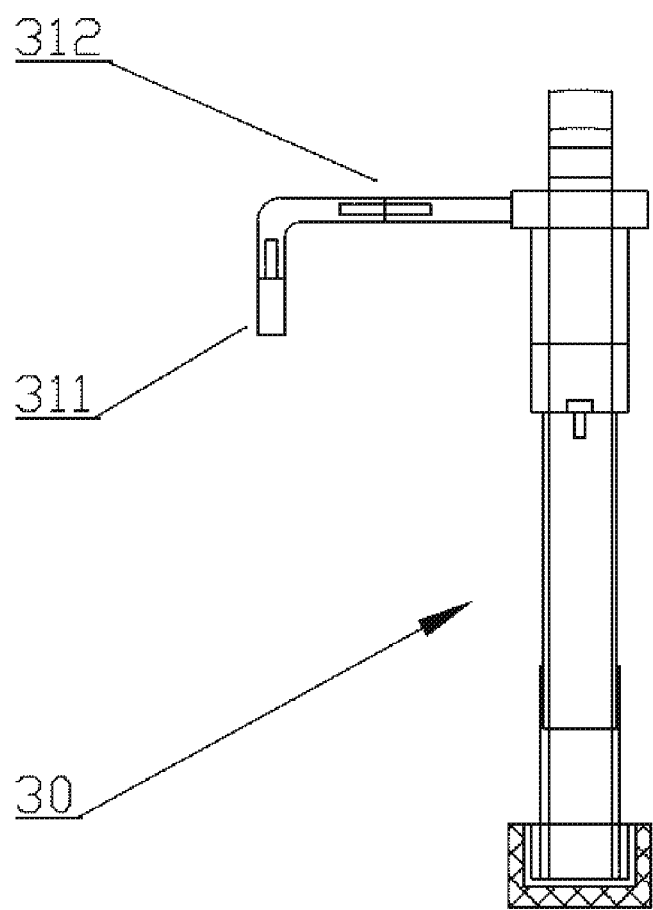
FIG. 7 is a left view of the jacking device in FIG. 6.

In addition, each of the internal claw portion 21 and the upper claw portion 22 is arranged as a two-section type structure, the two sections are connected movably to each other through a sliding chute and an insertion plate, and the lengths and widths of the internal claw portion 21 and the upper claw portion 22 can be adjusted by sliding and locking the insertion plates in the sliding chutes in order to be adapted conveniently to the height and width of the tyre 50; the external claw portion 23 and the connecting plate 25 are connected movably to each other through a sliding chute and an insertion plate arranged therebetween, moreover, the length and width of the external claw portion 23 can be adjusted by sliding and locking, and thus the lengths and widths of the internal claw portion 21, the upper claw portion 22 and the external claw portion 23 can be adjusted to be adapted to different specifications of wheel 51. Further referring to FIG. 6 and FIG. 7, the foregoing jacking device 30 comprises a jacking holder 31, the jacking holder 31 is provided with a tubular body 310, the tubular body 310 comprises an internal tube 34, a section tube 32 sheathing the lower portion of the internal tube 34 and a sleeve 314 sheathing the upper portion of the internal tube 34, wherein the internal tube 34 is locked with the sleeve 314 though a spring and a locking pin. An external tube 33 also sheathes the lower end of the section tube 32. The top of the tubular body 310 of the jacking holder 31 protrudes from the outer surface of the tyre 50, furthermore, a jacking head 35 is arranged at the top end (i.e. the top end of the internal tube 34), that is, the jacking head 35 also protrudes from the outer surface of the tyre 50. When the jacking head 35 is used for the escape of the tyre 50, as the auto tyre 50 rotates, the jacking head 35 can touch the pit ground, and thereby can jack the tyre 50 in an opposite direction. After the jacking head 35 fulfills the jacking function, by triggering the spring and the locking pin (not shown in the drawings) on the internal tube 34, the jacking head 35 can be withdrawn automatically, so that normal running cannot be affected after the tyre 50 escapes. Corresponding to the preferred embodiments of the present invention, the jacking head 35 is curved, but can also be of other irregular shapes, such as a plane, a spherical surface, etc. The bottom of the jacking holder 31 (i.e. the bottom of the external tube 33) is provided with a rubber pad 37 and a supporting tube 36 located between the rubber pad 37 and the external tube 33. The rubber pad 37 is in contact with the outer surface of the tyre 50, and can prevent the tyre 50 from being injured. In addition, an upper jaw 312 and an inner jaw 311 extend outward from the upper portion of the sleeve 314, the shape of a U is formed between the sleeve 314, the upper jaw 312 and the inner jaw 311, and the sleeve 314, the upper jaw 312 and the inner jaw 311 are fixed radially on the tyre 50 in a fixed clamping manner; and moreover, each of the upper jaw 312 and the inner jaw 311 is of a movable two-section type, so the lengths and widths of the upper jaw 312 and the inner jaw 311 can be adjusted by means of sliding chutes and insertion plates to match the size of the tyre 50. The sleeve 314 is mounted on the outer side of the tyre 50, the upper jaw 312 clamps the top surface of the tyre 50, and the inner jaw 311 clamps the inner side of the tyre 50. Under the sleeve 314, a pair of fixing claws 313 extend leftward and rightward, each fixing claw 313 is provided with a fastening head 315, and the fastening heads 315 are fastened fixedly with the fastening slots 24 in the external claw portion 23 of the tyre claw 20.

The jacking holder 31 comprises the inner jaw 311, the upper jaw 312, the fixing claws 313 and the sleeve 314; the upper jaw 312 is arranged fixedly and perpendicularly at the upper end of the sleeve 314, the inner jaw 311 is arranged perpendicularly on the upper jaw 312, the section tube 32 is fixedly arranged under the sleeve 314, and the external tube 33 movably sheathes the outside of the section tube 32 by means of a locking pin; the supporting tube 36 sheathes the lower end of the external tube 33, the orifice of the lower end of the supporting tube 36 is sealed, and the rubber pad 37 is arranged on the outside of the supporting tube 36; the internal tube 34 is inserted in the sleeve 314 and the section tube 32, and the jacking head 35 is fixed integrally at the top end of the internal tube 34.

Figure 8A:
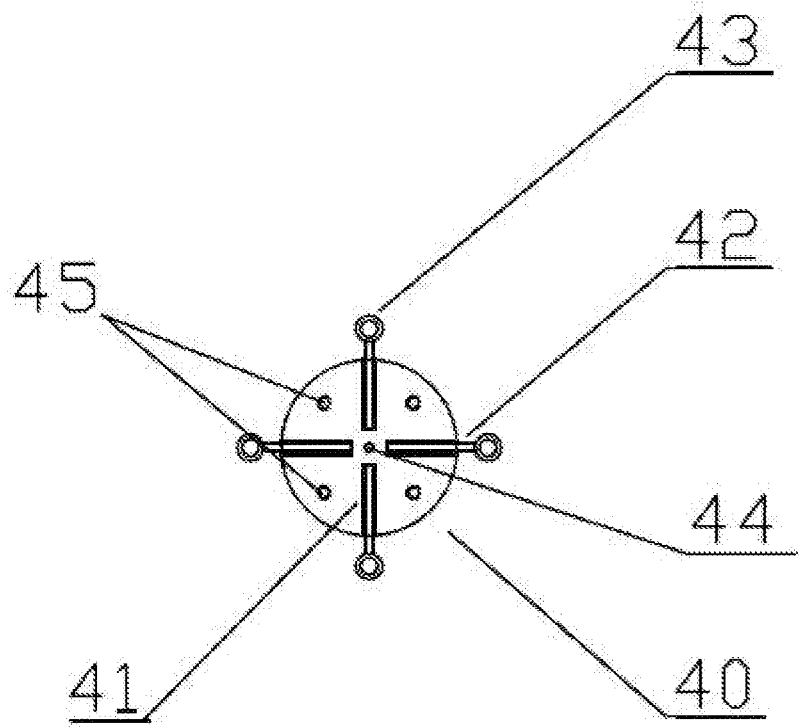
Figure 8B:
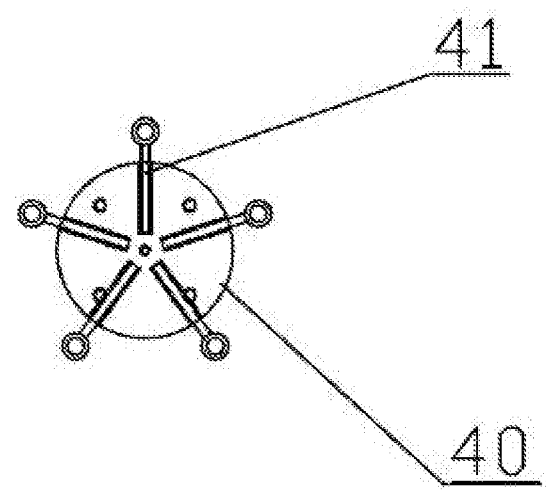
Figure 8C:
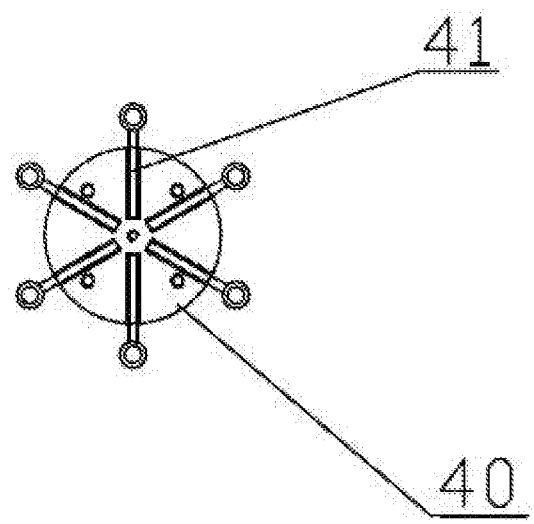
Figure 9A:
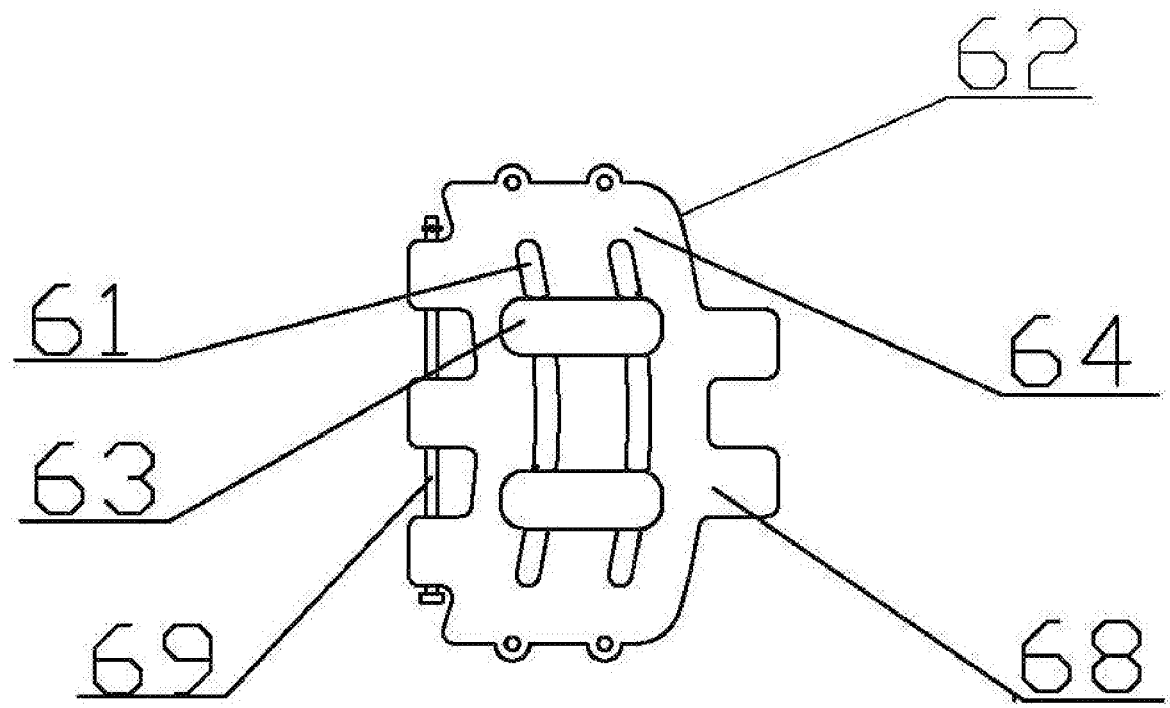
Figure 9B:
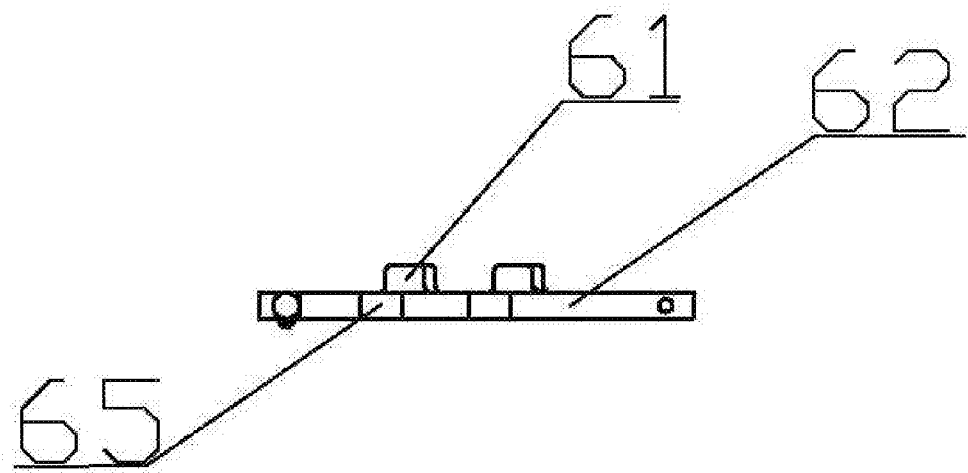
Figure 9C:
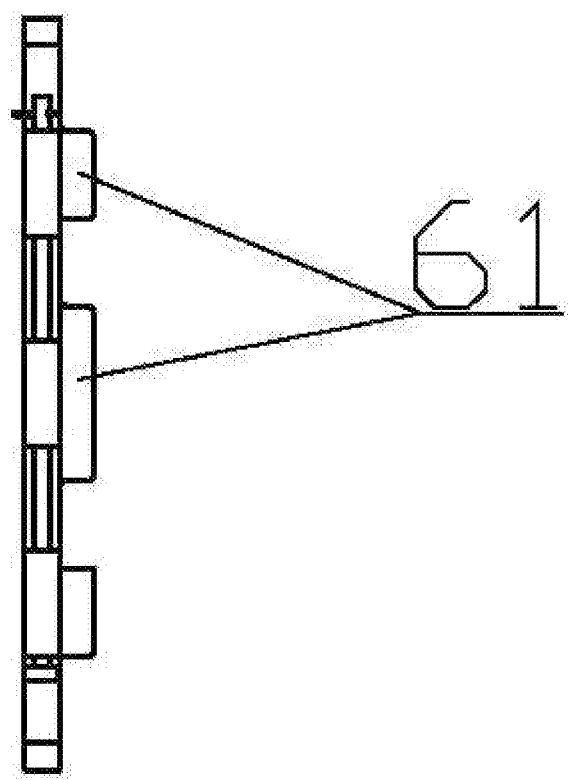
Figure 9D:
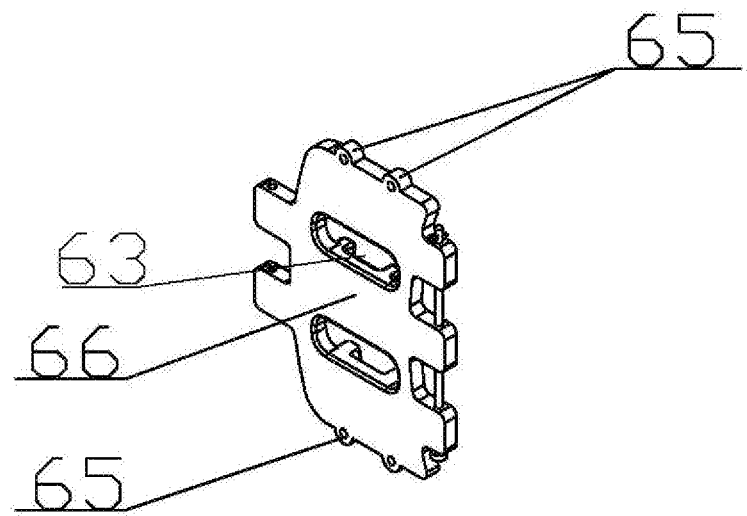
Figure 9E:
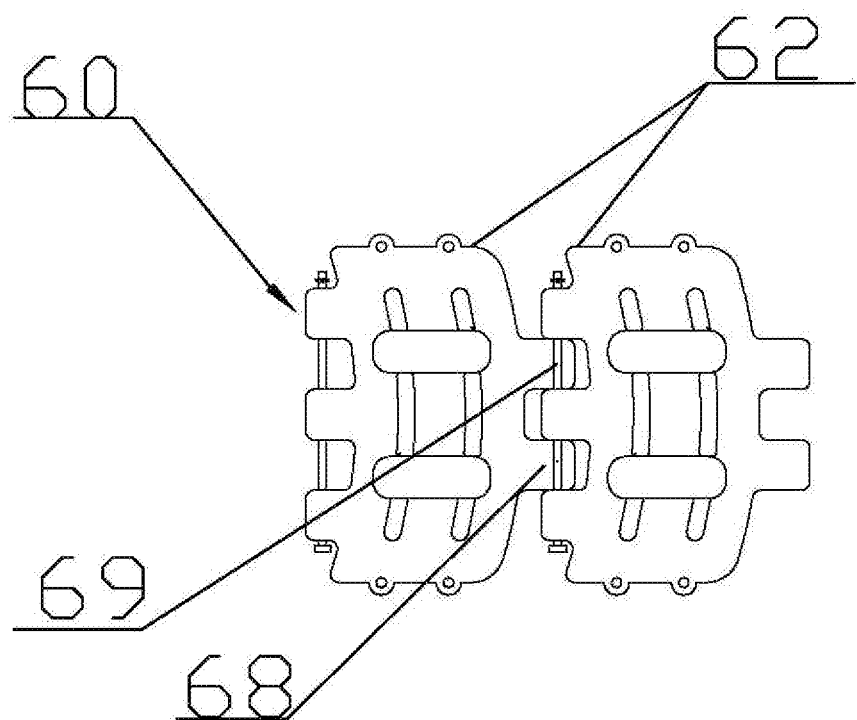
Figure 10A:
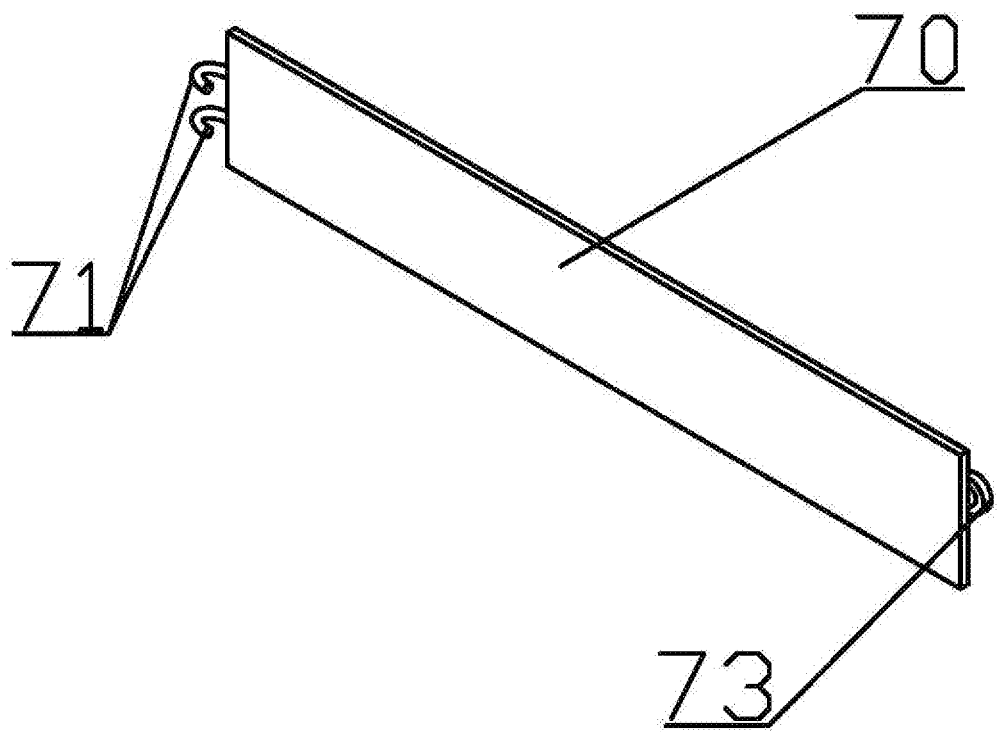
Figure 10B:
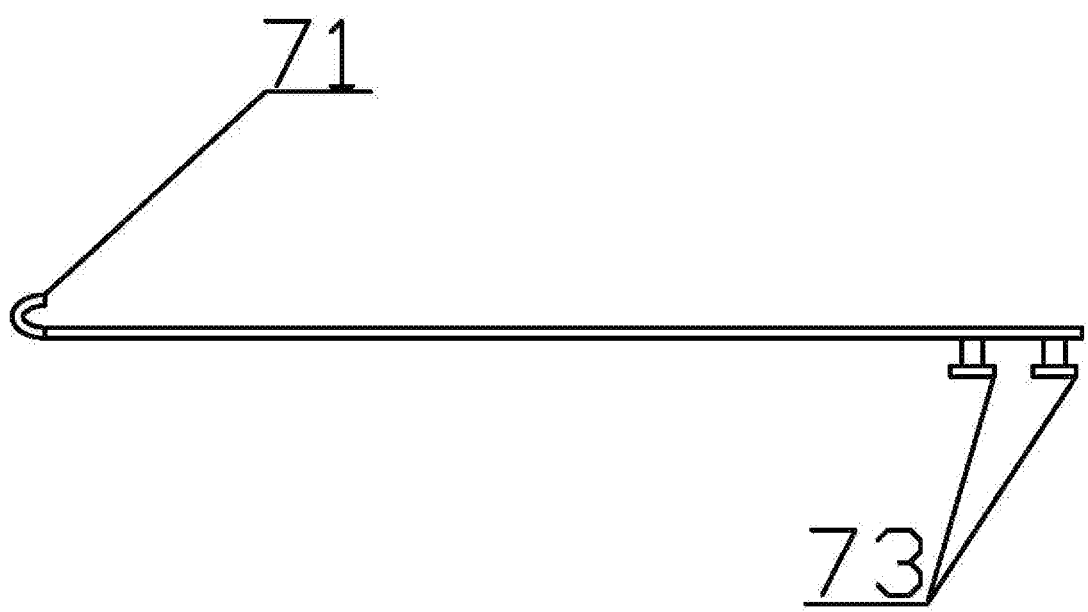
Figure 10C:
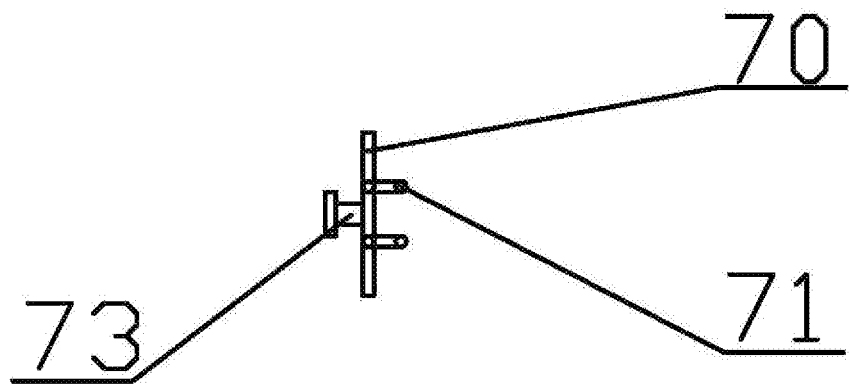
Figure 11A:
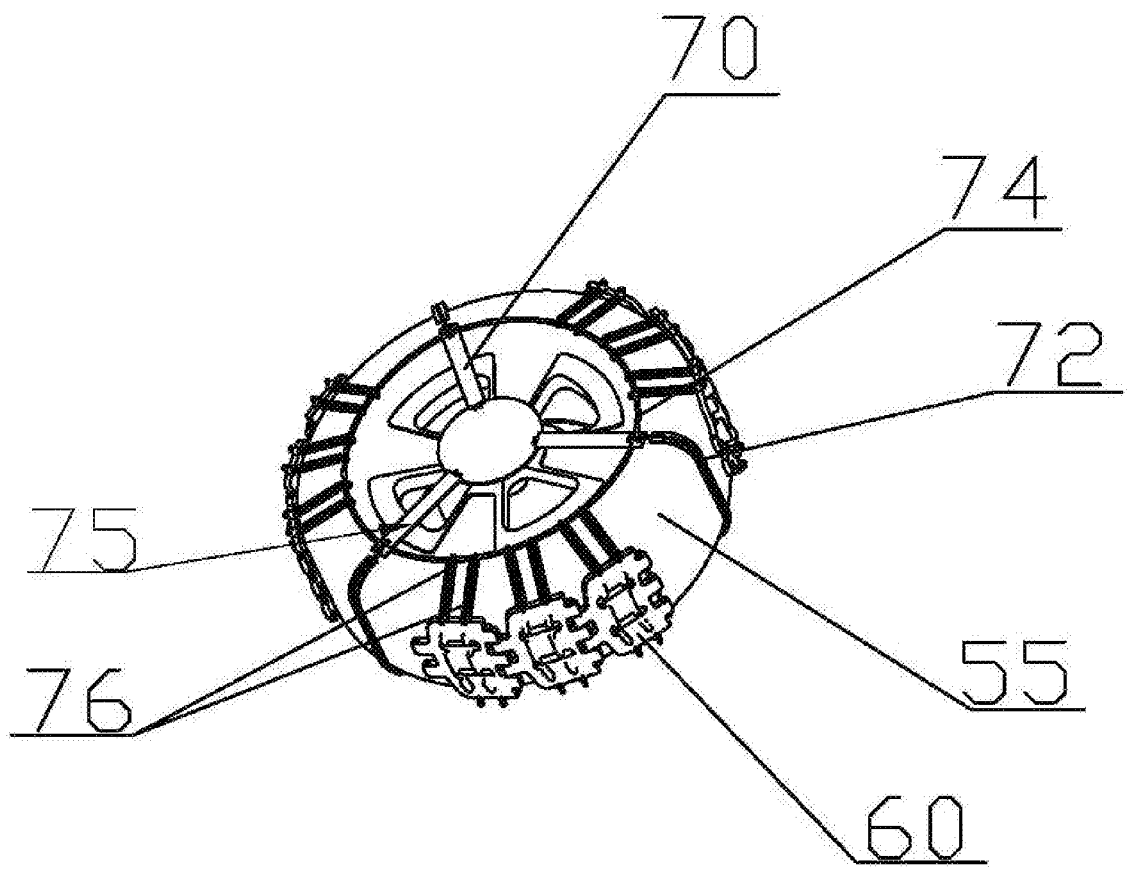
Figure 11B:
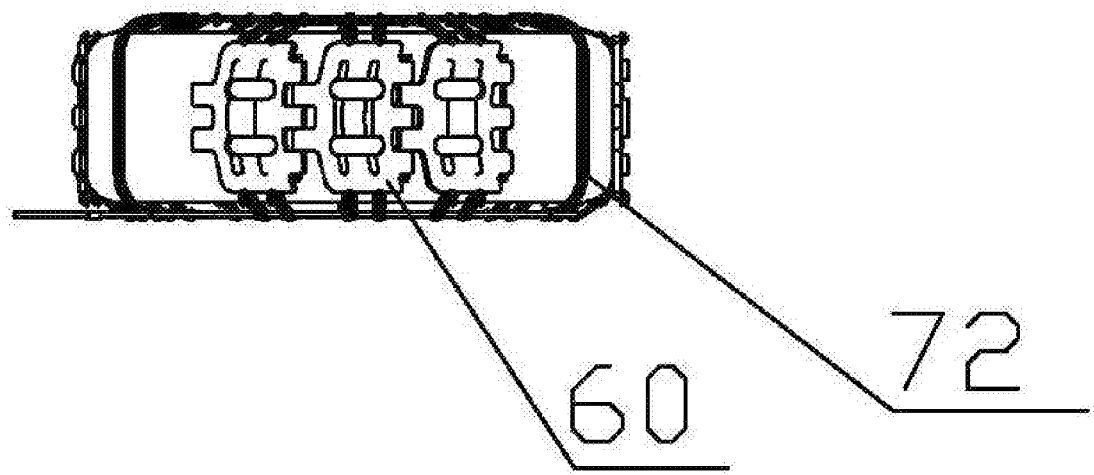
Figure 11C:
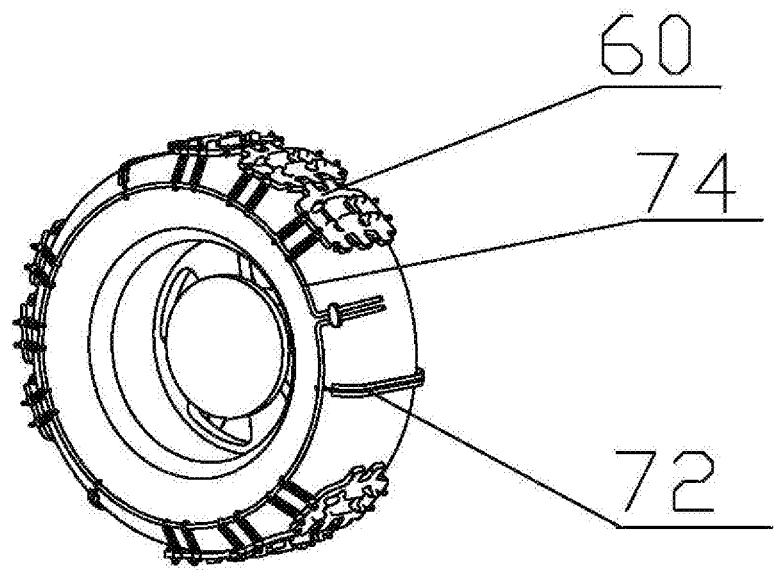
Figure 11D:
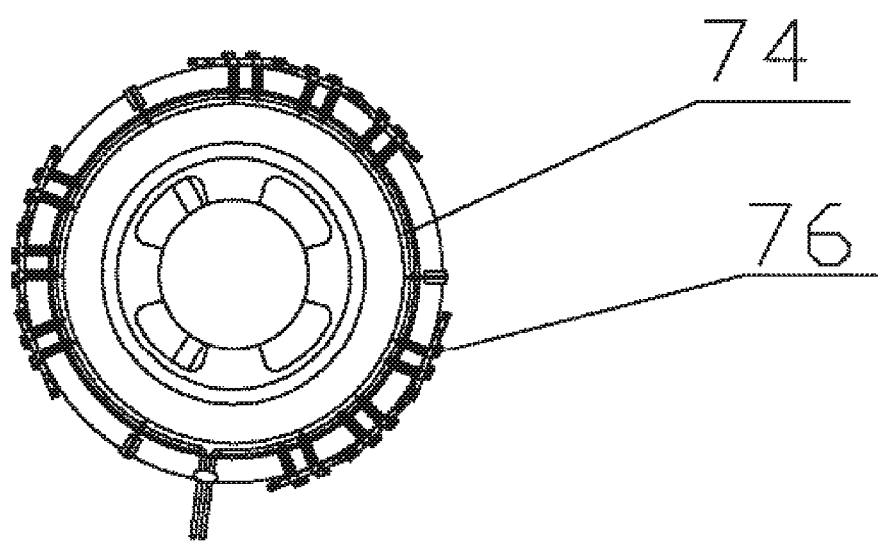

Further referring to FIG. 8, the escape device for self-rescue in the case of an auto tyre being trapped in a pit disclosed by the present invention further comprises a driving disk 40, and the driving disk 40 is of a disk-shaped structure, and is provided with a central screw hole 44 and circumferential screw holes 45 matching the central positioning disk 10 in order to be fixedly connected to the central positioning disk 10 through bolts. Four (see FIG. 8a) or five (see FIG. 8b) or six (see FIG. 8c) slide ways 41 are arranged radially and evenly on the driving disk 40, guide plates 42 are arranged movably in the slide ways 41, bolt holes 43 are arranged fixedly at the outer ends of the guide plates 42, the radial distances of the bolt holes 43 can be adjusted by the guide plates 42, and by connecting the bolt holes 43 to an external device, dragging or winching can be done by external power to transmit a power fulcrum.

In addition, referring to FIGS. 9a-9e, the escape device for self-rescue in the case of an auto tyre being trapped in a pit disclosed by the present invention is further provided with an anti-skid chain plate device, also called snow net device, which comprises anti-skid chain plates 60 and a tying assembly connected to the anti-skid chain plates 60, and the anti-skid chain plate device is used along with the tyre 50, and is used for preventing skidding and increase grip or frictional force on a muddy or snow-covered road surface. A plurality of chain links 62 is connected to one another to form the chain plate 60. Each chain link 62 is provided with an anti-skid surface 64 and a resistance-increasing surface 66. The anti-skid surface 64 has a certain radian, and is outward to touch the ground; and the resistance-increasing surface 66 is in contact with the tread of the tyre. The chain link 62 is provided with a plurality of lugs 61 protruding on the anti-skid surface 64 and a pair of slots 63, and the lugs 61 can increase the frictional force of contact with the ground. Both sides of each chain link 62 are provided with a first connector 68 and a second connector 69. The first connector 68 of the chain link 62 can be fastened fixedly with the second connector 69 of the neighboring chain link 62, and thus the connectors 68 of each two adjacent chain links 62 can be disassembled or assembled movably, so that the length of the anti-skid chain plate 60 can be adjusted according to the size of the actual tyre 50. Corresponding to the preferred embodiments of the present invention, three sets of anti-skid chain plates 60 can be arranged, and three chain links 62 are connected to one another to form each set of anti-skid chain plate 60. In addition, both ends of each chain link 62 are provided respectively with fastening holes 65. Further referring to FIGS. 10a-11d, the tying assembly comprises positioning plates 70, tying straps 72, connecting rings 74 and connecting hooks 76. Corresponding to the preferred embodiments of the present invention, there are three positioning plates 70, which are arranged evenly along the radial direction of the tyre 50, one end of each positioning plate 70 is provided with fastening hooks 71, which are connected to the parallel rings 15 of the foregoing positioning disk 10 in a fastening manner, and the other end is provided with a pair of positioning pins 73. The tying straps 72 are tied on the tyre 50, one end is fastened to the positioning pins 73, and the other end is fastened to the connecting ring 74. Each connecting ring 74, which is shaped like a circular ring, fits the circumference of the tyre 50, and is positioned between the positioning plate 70 and the pair of positioning pins 73. One end of the foregoing connecting hook 76 hooks the fastening hole 65 of the chain link 62, the other end hooks the connecting ring 74, both ends of each chain link 62 are connected respectively to the connecting ring 74 through two of the tying straps 72, and thus each set of chain plate 60 can be tied on the tread 55 of the tyre 50 in contact with the ground.

Preferably, the material adopted by the anti-skid chain plates 60 can be wire cables, chains, plastic nets or nails. The chain plate 60 can also be provided with a single piece of chain link 62, three pieces of chain links 62 or four to sixty pieces of chain links 62, so that dismounting is free or the length can be increased or changed. Thus it can be seen that through the cooperation between the foregoing anti-skid chain plates 60 and the foregoing tying assembly, when the auto tyre encounters a snow ground or a muddy ground, the foregoing chain plates 60 can be mounted conveniently and quickly on the tread 55 of the auto tyre 50, thus having a good anti-skid effect.

Under the trapped state of the automobile, when the auto tyre 50 runs into a pit or skids to idle, the steps of mounting and operating the escape device for self-rescue in the case of an auto tyre being trapped in a pit disclosed by the present invention are as follows:

1. the tyre claws 20 are assembled, more specifically, three groups of tyre claws 20 are chosen normally, and after each of the claw portions 21, 22, 23 is adjusted to a corresponding height according to the size of the actual auto tyre 50, the tyre claws 20 are assembled evenly onto a wheel along the radial direction of the wheel in a fastening manner;

2. the central positioning disk 10 is assembled, more specifically, the central positioning disk 10 is arranged at the approximately central position 54 of the wheel 51, the parallel rings 15 on the central positioning disk 10 are then fastened respectively with the threaded hooks 26 of each tyre claw 20, and the handle 13 is then rotated to move inward, so that the suction cup 11 on the screw 12 sucks the central position 54 of the wheel 51;

3. the upper jaw 312 and inner jaw 311 of the jacking device 30 are arranged respectively on the top and inner side of the tyre 50 and clamp the tyre 50, the fastening heads 315 of the fixing claws 313 on the jacking holder 31 are then fastened fixedly with the fastening slots 24 of the neighboring tyre claws 20 on both sides, moreover, the section tube 32 is inserted into the external tube 33, and is fixed by the plug pin after the position is adjusted, and the lower portion of the external tube 33 extends to the supporting tube 36 and is fixed; and 4. the internal tube 34 is then put into the sleeve 314, the height of the jacking head 35 at the end of the internal tube 34 is adjusted, so that the jacking head 35 can be placed on the snow ground or the pit ground, and after the spring and the locking pin on the internal tube 34 and the sleeve 314 are arranged, the automobile can be started; as the auto tyre 50 rotates, the jacking head 35 of the jacking device 30 rotates and abuts against the snow ground or the pit ground, so that the tyre 50 can be "jacked" effectively, consequently, the auto tyre 50 conveniently, quickly and safely gets out of the pit, and finally, the escape device of the present invention is then disassembled and restored quickly.

In addition, according to the trapped condition of the automobile, the escape device of the present invention can be used along with the anti-skid chain plate device by the foregoing method, thus, skidding on the wet and slippery road surface can be prevented more effectively, and the safety of driving is increased.

If needed further, the driving disk 40 can cooperate with an external device, and can be connected effectively to other tool and equipment. According to an actual vehicle model, a matching driving disk 40 is chosen and assembled to the holes of the central positioning disk 10, screws are used for fixed connection, so that the central positioning disk 10 is locked in the screw holes of the driving disk 40, and thereby assembly is completed. For example, after the driving disk 40 is connected to a "winch", the wheel can be used as a "winch device", and the automobile can assist itself or another vehicle to get out; after the driving disk 40 is connected to an "air pump" or a "water pump", the driving disk 40 can exert an inflating or water pumping function, and mostly this function can be brought into play in rural, field or natural disaster areas or human rescue areas.

By means of the foregoing embodiments, the present invention has the advantages which can be seen are as follows: a special device is provided for effective self-rescue and rapid escape when an automobile skids, sinks or is trapped in a pit under the situation of a bad weather, a snow-covered road surface or a harsh road condition. When the auto tyre encounters a pit and skids to idle, the escape device can be used for effectively, conveniently, quickly and safely getting the auto tyre out of the pit in a "jacking" manner, and the escape device can be disassembled and restored quickly; and the escape device is convenient to use and easy and quick to assemble and disassemble. The present invention can also be applied in the process of natural disaster rescue; as the escape device is equipped with the anti-skid chain plates and the driving disk, the escape device can rescue other trapped and sinking automobiles; the anti-skid chain plates can be quickly and conveniently assembled for use; and by means of the driving disk, the escape device can be connected to other tools and equipment, so that the application range of the present invention can be further broadened.

It should be noted that the foregoing preferred embodiments are merely intended to describe the technical concept and characteristics of the present invention. Their purpose is to enable those familiar with this technique to comprehend and implement the content of the present invention, and the protection scope of the present invention cannot be limited hereby. Any equivalent alteration or modification which is made according to the spirit of the present invention shall be covered by the protection scope of the present invention.

What is claimed is:

1. An escape device for self-rescue in the case of an auto tyre being trapped in a pit, comprising a central positioning device, at least one tyre claw and a jacking device; when an auto tyre needs to escape, the central positioning device is positioned and mounted at a central position of a wheel, the tyre claw and the central positioning device are fitted to each other and clamp the tyre, the jacking device and the tyre claw are fitted to each other, the jacking device is further provided with a jacking head capable of being supported on the pit ground, and the jacking head protrudes out of the auto tyre.

2. The escape device for self-rescue in the case of an auto tyre being trapped in a pit according to claim 1, wherein the central positioning device comprises a central positioning disk, which is mounted fixedly at the central position of the wheel.

3. The escape device for self-rescue in the case of an auto tyre being trapped in a pit according to claim 2, wherein the central positioning disk is provided with a central screw hole, and the central screw hole corresponds to the central position of the wheel.

4. The escape device for self-rescue in the case of an auto tyre being trapped in a pit according to claim 3, wherein the central positioning device further comprises a suction cup and a screw inserted in the central screw hole, the suction cup sucks the central position of the wheel and one end of the screw is connected to the suction cup, while the other end is provided with a handle.

5. The escape device for self-rescue in the case of an auto tyre being trapped in a pit according to claim 2, wherein that the central positioning device further comprises at least one set of parallel rings, the parallel rings are arranged on the outer edge of the central positioning disk and consists of a plurality of rings.

6. The escape device for self-rescue in the case of an auto tyre being trapped in a pit according to claim 1, wherein that the tyre claw is provided with an external claw portion, an internal claw portion and an upper claw portion connected between the external claw portion and the internal claw portion, and the length of the external claw portion, the internal claw portion or the upper claw portion can be adjusted.

7. The escape device for self-rescue in the case of an auto tyre being trapped in a pit according to claim 6, wherein the external claw portion comprises a connecting plate, the lower end of the connecting plate has threaded hooks, the central positioning device comprises at least one set of parallel rings, and the threaded hooks are fastened with the parallel rings.

8. The escape device for self-rescue in the case of an auto tyre being trapped in a pit according to claim 1, wherein the jacking device comprises a jacking holder, the jacking holder comprises a tubular body and fixing claws arranged on the left side and the right side of the tubular body, the tyre claw is provided with fastening slots, and the fixing claws are fitted in the fastening slots.

9. The escape device for self-rescue in the case of an auto tyre being trapped in a pit according to claim 8, wherein one end of the tubular body is provided with the jacking head, and the other end is provided with a rubber pad.

10. The escape device for self-rescue in the case of an auto tyre being trapped in a pit according to claim 8, wherein a spring and a locking pin are arranged in the tubular body.

11. The escape device for self-rescue in the case of an auto tyre being trapped in a pit according to claim 8, wherein that the jacking holder is provided with an upper jaw and an inner jaw which are mounted on the auto tyre, and the upper jaw extends outward from the tubular body.

12. The escape device for self-rescue in the case of an auto tyre being trapped in a pit according to claim 1, further comprising an anti-skid chain plate device mounted on the auto tyre.

13. The escape device for self-rescue in the case of an auto tyre being trapped in a pit according to claim 12, wherein the anti-skid chain plate device comprises anti-skid chain plates and a tying device for tying the anti-skid chain plates on the auto tyre.

14. The escape device for self-rescue in the case of an auto tyre being trapped in a pit according to claim 13, wherein the anti-skid chain plate comprises at least one chain link, and the anti-skid chain plates are mounted on a tread of the auto tyre.

15. The escape device for self-rescue in the case of an auto tyre being trapped in a pit according to claim 14, wherein the tying device comprises positioning plates and tying straps, the positioning plates are connected between the central positioning device and the tying straps, and the tying straps are tied on the auto tyre.

16. The escape device for self-rescue in the case of an auto tyre being trapped in a pit according to claim 15, wherein the tying device further comprises connecting rings and connecting hooks, the connecting rings match the sides of the tyre and are fitted to the positioning plates, one end of each connecting hook is connected to one anti-skid chain plate, and the other end is connected to one connecting ring.

17. A method for mounting and using the escape device for self-rescue in the case of an auto tyre being trapped in a pit according to claim 1, comprising the following steps:
   (1) the tyre claws are assembled, and after being adjusted to corresponding heights according to the size of an actual auto tyre, the tyre claws are assembled evenly onto a wheel along the radial direction of the wheel in a fastening manner;
   (2) the central positioning device is assembled, the central positioning device is mounted at the central position of the wheel of the auto tyre trapped in a pit, and is fastened fixedly with the tyre claws;
   (3) the jacking device is mounted on the auto tyre, and is also fitted fixedly to the tyre claw; and
   (4) an automobile is started, the jacking device rotates along with the trapped tyre, so that the jacking head thereon is supported on the snow or pit ground to jack the auto tyre, and thereby the automobile gets out of the pit.

18. The method for mounting and using the escape device for self-rescue in the case of an auto tyre being trapped in a pit according to claim 1, the method comprising providing an anti-skid chain plate device, the anti-skid chain plate device comprises anti-skid chain plates and a tying device, and the tying device is fastened fixedly with the central positioning device and fixedly mounts the anti-skid chain plates on the tread of the auto tyre.

\* \* \* \* \*